3,654,174
PROCESS FOR MAKING IMPROVED PHOSPHATE PHOSPHORS FROM BRUSHITE
Ernest A. Dale, Hamilton, and Martha J. B. Thomas, Winchester, Mass., assignors to GTE Sylvania Incorporated
No Drawing. Continuation-in-part of application Ser. No. 819,409, Apr. 25, 1969. This application Apr. 14, 1971, Ser. No. 134,084
Int. Cl. C09k 1/34
U.S. Cl. 252—301.4 P
6 Claims

ABSTRACT OF THE DISCLOSURE

An improved form of $Ca_2P_2O_7$ for phosphors is made by precipitating particulate $CaHPO_4 \cdot 2H_2O$ from a solution, washing the precipitated powder, removing most of the water from the wet powder to provide a fairly free flowing material and carefully heating the material at a temperature sufficient to convert it to $Ca_2P_2O_7$, the particles being maintained in agglomeration-preventing motion throughout the heating process. The $Ca_2P_2O_7$ is then mixed with other phosphor raw materials and fired to form the phosphor.

CROSS-REFERENCE TO RELATED APPLICATIONS

This application is a continuation-in-part of Ser. No. 819,409, filed on Apr. 25, 1969, now abandoned.

In a copending application, filed on even date herewith by E. A. Dale, M. J. B. Thomas and K. H. Butler, entitled "Process For Making Improved Phosphate Phosphors From Monetite," a process is disclosed for preparing phosphors from $CaHPO_4$. The instant application relates to a process for preparing phosphors from $CaHPO_4 \cdot 2H_2O$.

BACKGROUND OF THE INVENTION

Field of the invention

This invention relates to phosphors containing calcium and phosphate ions, such as pyro-, ortho- and halophosphate phosphors. It particularly relates to a process for making phosphors having improved luminescent properties.

Description of the prior art $CaHPO_4$ (monetite) is a material commonly used in the preparation of many different phosphors. In the manufacture of $CaHPO_4$, its hydrated analog $CaHPO_4 \cdot 2H_2O$ (brushite) is first precipitated under controlled conditions to obtain a desired particle size from a solution containing phosphate ions and calcium ions, such as, for example, from a solution of $(NH_4)_2HPO_4$ and $CaCl_2$. Such a process is disclosed in U.S. Pat. 3,505,012 issued on Apr. 7, 1970 to E. A. Dale et al. and entitled "Process For Making The Brushite Form Of Calcium Hydrogen Phosphate." The precipitate is then dehydrated by controlled heating, in the mother liquor, to a temperature between about 60° C. and 95° C. The $CaHPO_4$ thus produced was then washed, dried and could then be directly used in the preparation of phosphors.

In the preparation of such phosphors, $CaHPO_4$ was mixed with other raw materials, such as $CaCO_3$, $CaCl_2$, $CaF_2$ and with activating compounds such as $Sb_2O_3$. The mixing was then followed by controlled firing to yield luminescent materials.

During the firing process the following intermediate reaction would occur:

$$2CaHPO_4 \rightarrow Ca_2P_2O_7 + H_2O$$

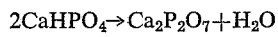

The weight of water produced was 6.62% of the weight of $CaHPO_4$. The evolution of this water vapor could easily strip out some of the other constituents in the phosphor blend, such as chloride (in the form of HCl), the phosphorus (in the form of POCl), antimony (in the form of $SbCl_3$ or $Sb_2O_3$), and the like, which, in turn, could upset the desired stoichiometry of the phosphor.

If the $CaHPO_4$ were converted to $Ca_2P_2O_7$, such as by firing in a crucible before being blended into the phosphor mix, many of these problems could be eliminated. However, evolution of the water through the cake of $CaHPO_4$ could result in sintering and agglomeration of the particles, the effect of which would be to increase the average particle size of the resultant $Ca_2P_2O_7$. This in turn, would reduce the efficiency and maintenance of phosphors prepared therefrom, since those properties are highly dependent on the particle size of the phosphor. A large particle size can result in a phosphor layer of excessive thickness that will reduce the light transmission thereof, and thus also the lamp efficiency. If the particle size of the phosphor is too small, the lamp efficiency will also be reduced because of a light-scattering effect of the fine particles.

Another disadvantage to the use of $CaHPO_4$ in the phosphor blend is that corrosive gases, resulting from the evolution of water and its reaction with other phosphor constituents, can be liberated into the controlled atmosphere of the phosphor furnace.

In the wet conversion of brushite to $CaHPO_4$ mentioned above, that is, when the brushite precipitate is dehydrated in the mother liquor, there is usually a change in the stoichiometric ratio of Ca to P. The brushite is precipitated under conditions that will generally yield an optimum stoichiometric ratio; any change in the stoichiometric ratio can yield a less efficient phosphor and is, therefore undesirable. In a typical case of wet conversion, the Ca/P ratio increased 3.6%.

SUMMARY OF THE INVENTION

This invention discloses a process for producing $Ca_2P_2O_7$ from $CaHPO_4 \cdot 2H_2O$ wherein the crystalline morphology of the resultant $Ca_2P_2O_7$ is substantially unchanged from that of the $CaHPO_4 \cdot 2H_2O$. The $CaHPO_4 \cdot 2H_2O$ employed in our invention may be that disclosed above in 3,505,012, wherein brushite having a desired purity, reactivity and particle size is precipitated from a solution.

The $CaHPO_4 \cdot 2H_2O$ thus precipitated is then immediately removed from its mother liquor by, for example, suction filtration or centrifuging, and is then washed only enough to remove impurities. Excessive washing can undesirably change the stoichiometric ratio of Ca to P. The wet powder is then dried sufficiently by filtration or centrifuging to provide a fairly free flowing material. The $CaHPO_4 \cdot 2H_2O$ is then converted to $Ca_2P_2O_7$ under such conditions that the crystalline morphology of the $Ca_2P_2O_7$ is substantially unchanged from that of the $$CaHPO_4 \cdot 2H_2O$$

and the particle size is not increased.

The conversion is effected by heating the $$CaHPO_4 \cdot 2H_2O$$

particles to a temperature that will produce $\gamma\text{-}Ca_2P_2O_7$ while the particles are maintained, throughout the heating process, in a motion that separates the particles from one another. The motion must be sufficient to prevent substantially any agglomeration or sintering together of the particles through the conversion process. That is to say, the motion must be sufficient to prevent any clustering together of particles that would result in an increased particle size when determined by, for example, sedimentation analysis or a Fisher Sub Sieve Sizer.

The heating temperature should be in the range of about 420° C. to 750° C., the lower temperature being that necessary to attain substantially complete conversion.

Above about 750° C., $\beta$-$Ca_2P_2O_7$ will be formed, instead of the desired $\gamma$-$Ca_2P_2O_7$. $\gamma$-$Ca_2P_2O_7$ is preferred since it has higher reactivity in the solid state than the $\beta$ form and results in phosphors having better luminescent properties than phosphors prepared from $\beta$-$Ca_2P_2O_7$.

DESCRIPTION OF THE PREFERRED EMBODIMENT $CaHPO_4 \cdot 2H_2O$ was precipitated from a solution of calcium chloride and ammonium hydrogen phosphate as disclosed in 3,505,012. Immediately after precipitation, 4800 grams of the wet powder was removed and loaded into a centrifuge basket. The basket was rotated at 750 r.p.m. for one minute to remove the mother liquor from the cake of powder. The cake was then washed for 5 minutes with deionized water sprayed thereon at a rate of 7000 cubic centimeters per minute while the cake was rotated at a speed of 750 r.p.m. At this point the wash water showed an absence of chloride ion by the silver nitrate test. The powder was then spin-dried for two minutes at a speed of 1500 r.p.m. to provide a fairly free flowing material having only about 10% moisture therein.

The partially dried $CaHPO_4 \cdot 2H_2O$ was then charged into one end of a stainless steel rotary, gas heated kiln, the kiln having a diameter of 6½ inches and a length of 7 feet. The kiln was inclined at a horizontal angle of 5° and was rotated at a speed of 8 r.p.m. At a kiln temperature of 540° C., the $CaHPO_4 \cdot 2H_2O$ was converted to $Ca_2P_2O_7$ in one pass, the residence time of the power in the kiln being about 8 minutes at a charge rate of 25 pounds per hour. The motion of the individual particles of powder within the kiln was a combination of sliding, rotating and tumbling, and was sufficient to prevent substantially any agglomeration or sintering together of the particles.

A halophosphate phosphor was made from the $Ca_2P_2O_7$ so produced, and tested in fluorescent lamps designated as A in Table I, following. The results were compared with those of control lamps designated as B, having the same halophosphate phosphor, but which was prepared from $Ca_2P_2O_7$ which, in turn, had been prepared from $CaHPO_4$.

TABLE I

|  | Lumens | |
| --- | --- | --- |
|  | Initial | After 100 hrs. operation |
| Test No. 1: |  |  |
| Lamp A | 3,258 | 3,185 |
| Lamp B | 3,199 | 3,139 |
| Test No. 2: |  |  |
| Lamp A | 3,167 | 3,106 |
| Lamp B | 3,115 | 3,016 |
| Test No. 3: |  |  |
| Lamp A | 3,177 | 3,110 |
| Lamp B | 3,084 | 3,040 |

It can be seen from the table that Lamp A, that is, the lamps having phosphors prepared in accordance with this invention, had 52 to 93 more lumens than the control initially and 46 to 90 more after 100 hours operation.

A comparison of particle size of the brushite and the calcium pyrophosphate prepared therefrom in accordance with this invention showed a reduction. Measured with a Fisher Sub Sieve Sizer, the brushite had an average particle size of 5.2 microns while that of the calcium pyrophosphate was 2.6 microns.

Heating means other than a rotary kiln could also be used to convert $CaHPO_4 \cdot 2H_2O$ into $Ca_2P_2O_7$ in accordance with this invention. For example, the powder could be maintained in agitation in a fluidized bed while being heated to the conversion temperature. The powder charge therein and rate of gas flow through the bed would, of course, have to be such as to maintain sufficient agitation of the powder to prevent substantially any agglomeration or sintering together of the particles.

It is desirable, in preparing $Ca_2P_2O_7$ in accordance with this invention, that the brushite be removed from the mother liquor immediately after the precipitation thereof, since the stoichiometric balance of Ca to P could be changed by prolonged exposure to the mother liquor. Excessive washing of the brushite powder could also have the same effect.

The following are offered as examples of pyro-, ortho- and halo-phosphate phosphors made in accordance with this invention. In all the examples, the $\gamma$-$Ca_2P_2O_7$ was prepared from $CaHPO_4 \cdot 2H_2O$ as described above.

EXAMPLE 1

Pyrophosphate phosphor: $Ca_{1.96}P_2O_7:Eu^{+2}{}_{.04}$

| Raw Material: | Weight in grams |
| --- | --- |
| $Ca_2P_2O_7$ | 498 |
| $Eu_2O_3$ | 14 |
| $(NH_4)_2HPO_4$ | 10.8 |

The above quantities of raw materials are thoroughly mixed and then fired for 2 hours at 1250° C. in air and then for 1 hour at 1220° C. in 1% $H_2$–99% $N_2$ to form the phosphor.

EXAMPLE 2

Orthophosphate phosphor: $Ca_{2.55}Zn_{.21}Mg_{.08}(PO_4)_2:Sn_{.02}$

| Raw material: | Weight in grams |
| --- | --- |
| $Ca_2P_2O_7$ | 254 |
| $CaCO_3$ | 55 |
| $MgCO_3$ | 6.7 |
| $ZnO$ | 17.1 |
| $SnO_2$ | 3 |

The above materials are thoroughly mixed and fired at 2000° F. for 2½ hours in 8% $H_2$–92% $N_2$.

EXAMPLE 3

Halophosphate phosphor: $Ca_{4.66}F_{.9}(PO_4)_3:Sb_{.04}$

| Raw material: | Weight in grams |
| --- | --- |
| $Ca_2P_2O_7$ | 12,578 |
| $CaF_2$ | 1,160 |
| $CaCO_3$ | 3,997 |
| $Sb_2O_3$ | 192 |

The materials are thoroughly mixed and fired at 2200° F. for 1½ hours in air. This phosphor was used in Lamps A, above.

EXAMPLE 4

Halophosphate phosphor:
$Ca_{4.64}Cd_{.06}F_{.835}Cl_{.19}(PO_4)_3:Sb_{.09}Mn_{.089}$

| Raw material: | Weight in grams |
| --- | --- |
| $Ca_2P_2O_7$ | 12,578 |
| $CaCO_3$ | 4,038 |
| $CaF_2$ | 1,706 |
| $NH_4Cl$ | 335 |
| $MnCO_3$ | 363 |
| $Sb_2O_3$ | 433 |
| $CdO$ | 254 |

The materials are throughly mixed and fired at 2125° F. for 3½ hours in nitrogen.

We claim:

1. In a process for making a pyro-, ortho- or halo-phosphate phosphor containing phosphate and calcium ions, the steps which comprise: precipitating brushite from a solution containing calcium ions and phosphate ions; removing the precipitated brushite from the solution; washing the brushite to remove impurities; drying the brushite sufficiently to provide a fairly free flowing powder; heating the powder, while maintaining it in agglomeration-preventing motion, to a temperature sufficient to convert it into $\gamma$-$Ca_2P_2O_7$; mixing the $\gamma$-$Ca_2P_2O_7$ with other phosphor raw materials; and firing the mixture to form a phosphor.

2. The process of claim 1 wherein said heating is at a temperature between 420° C. and 750° C.

3. The process of claim 1 wherein said drying is effected by centrifuging.

4. The process of claim 1 wherein said drying is effected by filtration.

5. The process of claim 1 wherein said agglomeration-preventing motion is provided by heating the brushite in an inclined rotating kiln.

6. The process of claim 1 wherein said agglomeration-preventing motion is provided by heating the brushite in a fluidized bed.

References Cited

UNITED STATES PATENTS

| | | | |
|---|---|---|---|
| 3,505,012 | 4/1970 | Dale et al. | 252—301.4 P |
| 3,549,553 | 12/1970 | Wachtel | 252—301.4 P |

ROBERT D. EDMONDS, Primary Examiner